(12) United States Patent
Umlauf

(10) Patent No.: US 11,691,550 B2
(45) Date of Patent: Jul. 4, 2023

(54) COVER ADAPTABLE TO MOVEABLE VEHICLE SEATS

(71) Applicant: 4Knines, LLC, Oklahoma City, OK (US)

(72) Inventor: James Umlauf, Glendale, AZ (US)

( * ) Notice: Subject to any disclaimer, the term of this patent is extended or adjusted under 35 U.S.C. 154(b) by 0 days.

(21) Appl. No.: 17/537,241

(22) Filed: Nov. 29, 2021

(65) Prior Publication Data

US 2023/0166645 A1    Jun. 1, 2023

(51) Int. Cl.
*B60N 2/60* (2006.01)
*A47C 31/11* (2006.01)
*A47C 31/10* (2006.01)

(52) U.S. Cl.
CPC ............ *B60N 2/6027* (2013.01); *A47C 31/10* (2013.01); *A47C 31/11* (2013.01); *B60N 2/60* (2013.01); *B60N 2/6009* (2013.01); *B60N 2/6018* (2013.01)

(58) Field of Classification Search
CPC ... B60N 2/60–609; A47C 31/10; A47C 31/11; A47C 31/113
See application file for complete search history.

(56) References Cited

U.S. PATENT DOCUMENTS

| | | | | |
|---|---|---|---|---|
| 8,740,309 B2 * | 6/2014 | Kajihara | ................... | B60N 2/58 297/452.38 |
| 9,669,742 B1 * | 6/2017 | Bailey | ..................... | B60R 5/006 |
| 9,845,033 B1 * | 12/2017 | Umlauf | .................... | B60N 2/36 |

* cited by examiner

*Primary Examiner* — Syed A Islam
(74) *Attorney, Agent, or Firm* — David R. Conklin; Kirton McConkie

(57) ABSTRACT

A seat cover for a vehicle may include a lower or bench portion sized and configured to extend over a horizontally-oriented top of a bench of a vehicle seat. The lower portion may include a first section and a second section separated by a slit. The seat cover for the vehicle may also include an upper or backrest portion coupled to the lower portion. The upper portion may be sized and configured to extend upwardly over a backrest of the vehicle seat. The seat cover may be divided into vertical sections that correspond to the seats of a bench seat in a vehicle. One or more of the vertical sections may be removable to accommodate movement of the vehicle seats.

20 Claims, 17 Drawing Sheets

COVER ADAPTABLE TO MOVEABLE VEHICLE SEATS

FIELD OF THE INVENTION

This invention relates to covers for upholstery and carpeted areas.

BACKGROUND OF THE INVENTION

Vehicles seats and cargo spaces are increasingly more modular. Especially second and third row seats in larger vehicles. The seats can be rearranged to accommodate different numbers of passengers and types of cargo. Second and third row seats are often arranged in rows and the various seats within the rows can be removed, folded downward, or folded upward to accommodate different purposes. Rearranging the seats also effects the shape of the cargo area and the size and shapes of items than can be accommodated.

A vehicle seat may include a backrest, which may include one or more upper sections, and a bench, which may include one or more lower sections. The vehicle seat may be designed to move between various configurations in order to, for example, allow items of various sizes to be transported in the vehicle. In some instances, one or more of the lower sections may be folded up and one or more other upper sections may be folded down. In some instances, one or more lower sections may be folded up while one or more other lower sections are folded down. Additionally, a seat that is part of a bench seat consisting of multiple seats, typically three, may detach from the other seats and slid forward or backwards or folded in on itself.

A cover for a vehicle seat and/or a cargo bed may be limited to a particular type of car, with particular dimensions and features, or a particular seat configuration. In some cases, the cover may not permit movement of the vehicle seat between the various configurations or may cover various features, such as seatbelts. In order to perform a particular function in the vehicle, the cover may need to be removed. Further, vehicle seats may be exposed to various events that may damage the vehicle seats due to, for example, pets, children, spills, objects, etc.

BRIEF SUMMARY OF THE INVENTION

The present invention relates to a cover for an interior of a vehicle. In particular, the present invention relates to a cover adaptable to multiple vehicle seat configurations. In some embodiments, the cover for the vehicle may include a seat cover. In some embodiments, the cover may be configured to cover a cargo area in the rear of a vehicle. In some embodiments, the cover is comprised of a single monolithic piece. In some embodiments, the cover may include a lower portion, which may be sized and configured to extend over a horizontally-oriented top of a bench of a vehicle seat.

In some embodiments, the cover may include a first lateral edge, a second lateral edge opposite the first lateral edge, an upper edge extending from the first lateral edge to the second lateral edge, a lower edge opposite the upper edge extending from the first lateral edge to the second lateral edge. In some embodiments, the cover may include a first slit extending a first length from the upper edge toward the lower edge, the first slit a first distance from the first lateral edge, a first section between the first lateral edge and the first slit. In some embodiments, the cover may include a second slit extending a second length from the upper edge toward the lower edge, a second section between the first slit and the second slit, a third section between the second slit and the second lateral edge.

In some embodiments, the length of the first slit may be equal to a distance between the upper edge and the lower edge. In some embodiments, the first slit may be connected by a first fastener, the first fastener extending a full length or a partial length of the first slit. In some embodiments, the first section may be detachable from the second section. In some embodiments, the first fastener may be one or more zippers, the zipper operable in multiple directions (e.g., up or down), the zipper fully or partially disconnecting the first section from the second section when the zipper is in an open position.

In some embodiments, the length of the second slit may be less than a distance between the upper edge and the lower edge. In some embodiments, the second slit may be connected by a second fastener, the second fastener extending a full length or a partial length of the second slit. In some embodiments, the second fastener may be one or more zippers, the zipper operable in multiple directions (e.g., up or down), the zipper partially disconnecting the second section from the third section when the zipper is in an open position.

In some embodiments, the cover may include one or more apertures through the upholstery cover. In some embodiments, the aperture may further comprise a removable cover for the aperture. In some embodiments, the aperture may be adjacent to the first slit. In some embodiments, the aperture may be adjacent to the second slit or to a terminus of the second slit.

In some embodiments, the cover may include a first slit and a second slit that may transition from a first orientation to a second orientation. The transition between the first orientation and the second orientation may be curved or angled. The degree of curvature may be between 0 and 360 degrees (e.g., 45 degrees, 90 degrees, or 180 degree). The first or second slit may curve sufficiently that a lower or upper portion of the slit may be adjacent to an upper edge of the aperture.

In some embodiments, the first slit may curve away from the lower edge towards the first lateral edge or towards the second lateral edge, the first slit may transition from a first orientation to a second orientation. The degree of curvature may be between 0 and 360 degrees (e.g., 45 degrees, 90 degrees, or 180 degree). In some embodiments, the first slit may transition from a first orientation to a second orientation at a midpoint between the upper edge and the lower edge. In some embodiments, the first slit may transition from a first orientation to a second orientation above a midpoint between the upper edge and the lower edge. In some embodiments, the first slit may transition from a first orientation to a second orientation below a midpoint between the upper edge and the lower edge. In some embodiments, the first slit may be connected by a first fastener, the first fastener extending a full length or a partial length of the first slit. In some embodiments, the fastener may be a single or bi-directional zipper.

In some embodiments, the second slit may curve away from the lower edge towards the first lateral edge or towards the second lateral edge, the second slit may transition from a first orientation to a second orientation. The degree of curvature may be between 0 and 360 degrees (e.g., 45 degrees, 90 degrees, or 180 degree). In some embodiments, the second slit may transition from a first orientation to a second orientation at a midpoint between the upper edge and the lower edge. In some embodiments, the second slit may transition from a first orientation to a second orientation above a midpoint between the upper edge and the lower edge. In some embodiments, the second slit may transition from a first orientation to a second orientation below a midpoint between the upper edge and the lower edge. In some embodiments, the second slit may be connected by a second fastener, the second fastener extending a full length or a partial length of the second slit. In some embodiments, the second fastener may be a single or bi-directional zipper.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. These drawings depict only typical embodiments of the invention and are not therefore to be considered to limit the scope of the invention.

DETAILED DESCRIPTION OF THE INVENTION

The presently preferred embodiments of the present invention will be best understood by reference to the drawings, wherein like reference numbers indicate identical or functionally similar elements. It will be readily understood that the components of the present invention, as generally described and illustrated in the figures herein, could be arranged and designed in a wide variety of different configurations. Thus, the following more detailed description, as represented in the figures, is not intended to limit the scope of the invention as claimed, but is merely representative of presently preferred embodiments of the invention.

Figure 1:
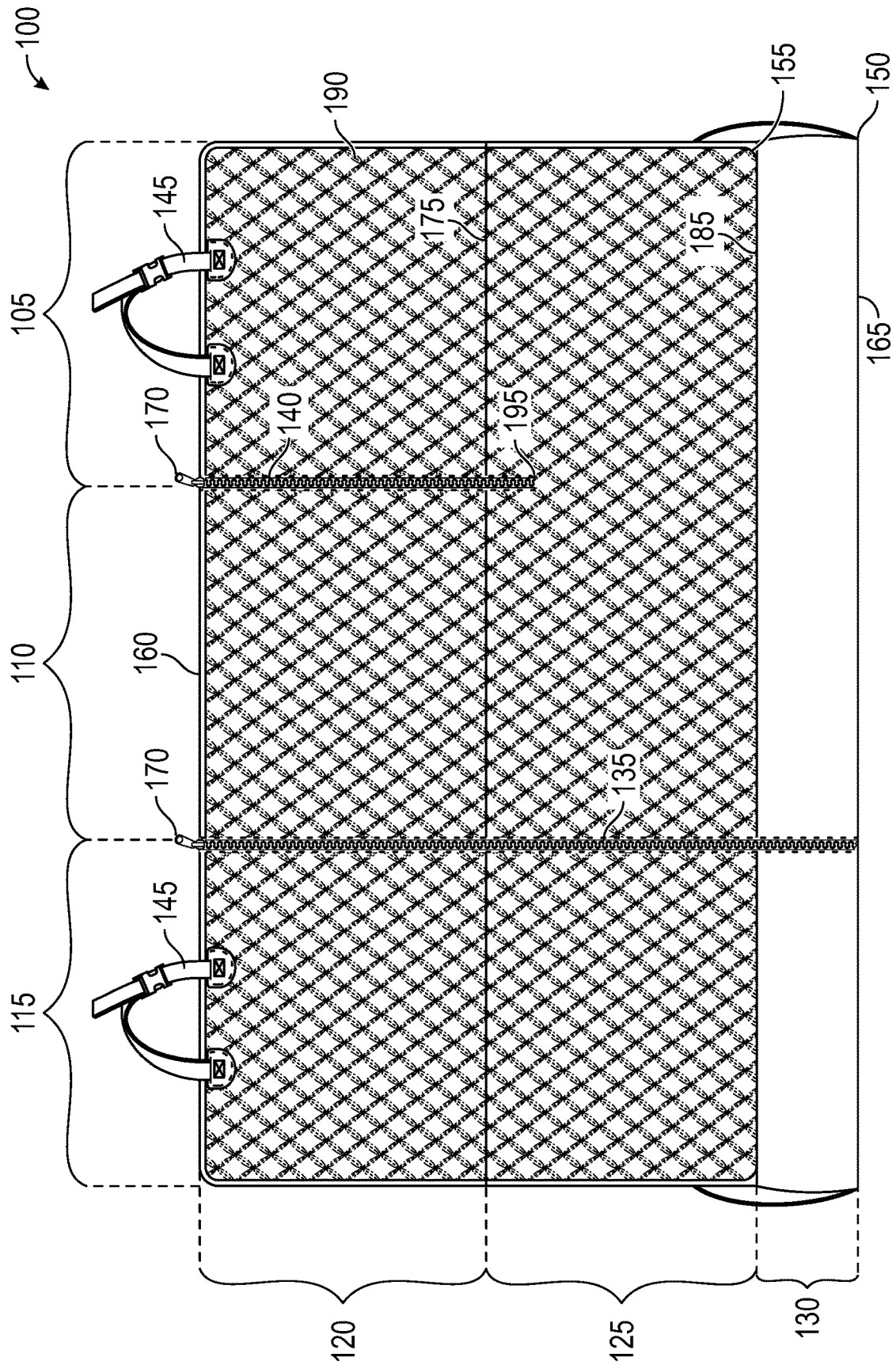
FIG. 1 is a top view of an example cover, according to some embodiments.

Referring now to FIG. 1, in some embodiments, the upholstery cover 100 for the vehicle may include a seat cover. In some embodiments, the upholstery cover 100 may include a lower portion 125, which also may be described as a bench portion or horizontal portion. In some embodiments, the upholstery cover 100 may also include an upper portion 120 coupled to the lower portion 125, wherein the upper portion 120 may also be described as a backrest portion or vertical portion. In some embodiments, the upholstery cover 100 may have a folded front portion 130 coupled to the lower portion 125 at the lower edge 185, wherein the folded front portion 130 may also be described as a guard portion or a front edge portion. In some embodiments, folded front portion 130 may comprise a pocket configured to engage or receive a front edge of a bench of a vehicle seat. In some embodiments, the upper portion 120, the lower portion 125, and the folded front portion may comprise three separate piece or two separate pieces that are joined together at a seam. In some embodiments, they may comprise one single, seamless piece.

In some embodiments, the upper portion 120 may include one or more sections. For example, the upper portion 120 may include one or more of the following: a first section 115, a second section 110, and a third section 105. In some embodiments, one or more of the following may extend from an upper edge 160 of the upper portion 120 to the transition between the upper portion and lower portion 175 or to the lower edge 185 of the lower portion 125 or to the bottom edge of the folded front 165 of the folded front portion 130 or to a position proximate to the transition between the upper portion and the lower portion 175 or to a position proximate to the lower edge 130 of the lower portion 125 or to a position proximate to the bottom edge of the folded front 165 of the folded front portion 130: the first section 115, the second section 110, and the third section 105. In some embodiments, the sections of the upper portion 120, the lower portion 125, and the folded front portion 130 may be separated by one or more slits. For example, the first and second sections 115, 110 may be separated by a first slit 135 and/or the second and third sections 110, 105 may be separated by a second slit 140.

In some embodiments, the slits 135, 140 of the upper portion 120, the lower portion 125 and/or the folded front portion 130 may be at least partially closed via one or more coupling mechanisms 170. In some embodiments, the upholstery cover 100 may include a first coupling mechanism 170, which may be configured to directly couple the first section 115 and the second section 110. In some embodiments, the first coupling mechanism 170 may be configured to at least partially close the first slit 135, which may extend from the upper edge 160 of the lower portion 125 and/or the folded front portion 130. In some embodiments, the upholstery cover 100 may include a second coupling mechanism 170, which may be configured to directly couple the second section 110 and the third section 105. In some embodiments, the second coupling mechanism 170 may be configured to at least partially close the second slit 140, which may extend from the upper edge 22 to the lower portion 12, or to a position proximate to the lower portion 12.

In some embodiments, the upper portion 120 may include one or more fasteners 145 configured to secure the upholstery cover 100 to the vehicle seat. In some embodiments, one or more of the following may include at least one fastener 145: an upper portion of the first section 115, an upper portion of the second section 110, and an upper portion of the third section 105. In some embodiments, the fasteners 145 may be configured to secure the upholstery cover 100 to one or more headrests of the vehicle. In some embodiments, the upper portion of the first section 115 and the upper portion of the third section 105 may include a fastener 145. Each of the fasteners 145 may include any suitable means of securing the upholstery cover 100 to the seat. For example, as illustrated in FIG. 1, each of the fasteners 145 may include a belt, which may be configured to form a loop around the headrest. In some embodiments, the loop may include a clasp.

According to some embodiments, the first section 115 may be fully detachable from the second section 110. The coupling mechanism 170 may extend the full length or a partial length of the first slit 135. The first slit 135 may be partially opened or fully opened. The coupling mechanism 170 may be a zipper and the zipper may function in one direction or may be bidirectional. According to one embodiment, the first slit 135 may be opened to a location proximate to the transition between the upper portion and the lower portion 175 to access a seatbelt buckle located on a bench portion of a vehicle seat. The first section 115 may be fully detached from the second section 110 permitting bench vehicle seats to be independently configured. For example, the first section 115 of the upholstery cover 100, when fully detached from the second section 110 and third section 105, may remain in place on the vehicle seat when the side vehicle seat slides behind or in front of the middle seat and the side seat of the bench seats. Alternatively, the first section 115 of the upholstery cover 100, when partially or fully separated from the second section 110 and the third section 105, may remain in place on the vehicle seat when the backrest of the passenger side or driver side seat folds downward onto the bench portion. Alternatively, the first section 115 of the upholstery cover 100, when partially or fully separated from the second section 110 and the third section 105, may remain in place on the vehicle seat when the bench portion of the passenger side or driver side seat folds upwards towards the backrest portion of the seat.

In some embodiments, the upper portion 120 of the second section 110 may be detached from the first section 115 and the third section 105. Additionally, the upper portion 120 of the second section 110 may be detached from the upper portion 120 of the third section 105 at the second slit 140. The upholstery cover 100 may remain attached to a backrest portion of a center seat in the bench seats when the backrest portion of the seat is folded downward and the upper portion 120 of the second section 110 is detached from the first section 115 and the third section 105. In response to the first section 115 being uncoupled from the second section 110 via the first coupling mechanism 170 and the third section 105 being uncoupled from the second section 110 via the second coupling mechanism 170, the upper portion 120 of the second section 110 may be folded downward over the lower portion 125. The first and second coupling mechanisms 170 may include any suitable coupling mechanism, such as for example, buttons, snaps, magnets, clasps, eyelets, hooks, one-directional or bi-directional zippers, hook and loop fastener, such as VELCRO™, etc.

In some embodiments, the upper portion 120 of the third section 105 is detachable from the upper portion 120 of the second section 110 at the second slit 140. The coupling mechanism 170 for the second slit 140 may extend a partial or a full length of the slit and may be partially opened or fully opened. The third section 105 may be detached from the second section 110 at the second slit 140, the upholstery cover 100 may remain attached to the seat when the backrest portion of the side bench seat is folded downward onto the bench portion. In some embodiments, the seatbelt and seatbelt buckle of the bench seat may be accessed through the upholstery cover 100 when the second slit 140 is fully or partially opened.

In some embodiments, the upholstery cover 100 may be constructed of a fabric material, such as, for example, one or more of the following: spandex knit, lycra knit, jersey knit, interlock knit, ribbed knit, terry knit, sweater knit, modal knit, hemp knit, bamboo knit, silk knit, cotton knit, ponte de roma, thermal knit, stretch lace, synthetic knit, organic knit, polyvinyl chloride, cotton, nylon, polyester, etc. In some embodiments, the fabric material may be stretchable. In some embodiments, the fabric material may be weatherproof and/or machine-washable.

In some embodiments, the upholstery cover 100 may include a folded front portion 130, which may be coupled to a lower edge 185 of the lower portion 125. In some embodiments, the folded front portion 130 may be selectively coupled to the lower edge 185. In some embodiments, when the upholstery cover 100 is used as a seat cover, the folded front portion 130 may be configured to extend vertically and/or generally perpendicularly from the lower portion 125. In some embodiments, the folded front portion 130 may include one or more fasteners, which may be configured to secure the upholstery cover 100 to the seat of the vehicle. Each of the fasteners may include any suitable means of securing the upholstery cover 100 to the seat.

In some embodiments, the upholstery cover 100 may be configured to hang from one or more headrests disposed on the bench seats of the vehicle. The upholstery cover may drape from fasteners 145 attached to the backrest portion of the seats, down to the bench portion of the seat. The lower portion 125 of the upholstery cover 100 may lie flat on the bench portion of the seat. Optionally, the upholstery cover 100 may include a folded front portion 130 that extends over the front edge of the bench seat and in some embodiments wraps under the bench portion of the vehicle seat.

In some embodiments, the first slit 135 and the second slit 140 may have a coupling mechanism 170 that extends along at least a portion of the slits 135, 140. In some embodiments, the coupling mechanisms may each include any suitable coupling mechanism, such as for example, one-directional or bi-directional zippers, buttons, snaps, magnets, clasps, eyelets, hooks, a hook and loop fastener, such as VELCRO™, etc.

In some embodiments, the vehicle seat may include a backrest, which may include one or more upper sections, and a bench, which may include one or more lower sections. The vehicle seat may be designed to move between various configurations in order to, for example, allow items of various sizes to be transported in the vehicle. In some embodiments, one or more upper sections of the backrest may be folded up and/or one or more other upper sections of the backrest may be folded down. In these and other embodiments, one or more lower sections of the bench may be folded up and/or one or more other lower sections of the bench may be folded down. In some embodiments, the first slit 135 and the second slit 140 may facilitate folding down one or more of the backrest sections of the vehicle seat or folding up of one or more bench sections of the vehicle seat.

In some embodiments, one or more of the vehicle seats of the bench seat may be maneuverable independently of the other seats. The seat may be maneuvered forward or backward independently of the other seats. The seat may be foldable independently of the other seats.

In some embodiments, the upholstery cover 100 may include a first layer of a fabric material and a second layer of a fabric material, which may be sewn together. In some embodiments, padding may be disposed between at least a portion of the first and second layers of the fabric material. In some embodiments, the folded front portion 130 may or may not include the padding. In some embodiments, the folded front portion 130 may include a single layer of the fabric material.

In some embodiments, the upholstery cover 100 may include another layer or backing layer, which may be disposed on at least a portion of an underside of the upholstery cover 100. For example, the backing layer may be disposed on an underside of the lower portion 125 and/or the upper portion 120. In some embodiments, the upholstery cover 100 may be used as a cargo bed cover, an example of which is described in U.S. Pat. No. 9,610,877, filed Jul. 20, 2016, entitled "Cover Adaptable to Multiple Vehicle Seat Configurations," which is herein incorporated by reference in its entirety. In some embodiments, when the upholstery cover 100 is used as a cargo bed cover, for example, the backing layer may be disposed on an underside of the lower and upper portions.

In some embodiments, when the upholstery cover 100 is used as a seat cover, the backing layer may be disposed on the underside of the lower portion 125. In some embodiments, the backing layer may be configured to prevent slippage and/or increase friction between the upholster cover 100 and the seat and/or the cargo bed. In some embodiments, the backing layer may include a netting. In some embodiments, the backing layer may be constructed of rubber, plastic, or another suitable material that allows the upholstery cover 100 to be flexible and/or foldable. In some embodiments, the upholstery cover 100 may include a water-proof coating. In some embodiments, one or more anchors may be coupled to the underside of the upholster cover 100. In some embodiments, the anchors may be configured to be tucked into a crease in the seat between the backrest and the bench of the seat. In some embodiments, the anchors may be loop-shaped.

In some embodiments, the upholstery cover 100 may have additional slits for accommodating additional seat configurations. In some embodiments, the upholstery cover 100 may be used for vehicle seats that fold upward in different configurations, an example of which is described in U.S. Pat. No. 9,963,086, issued May 8, 2018, entitled "Cover Adaptable to Multiple Vehicle Seat Configurations," which is herein incorporated by reference in its entirety.

Figure 2:
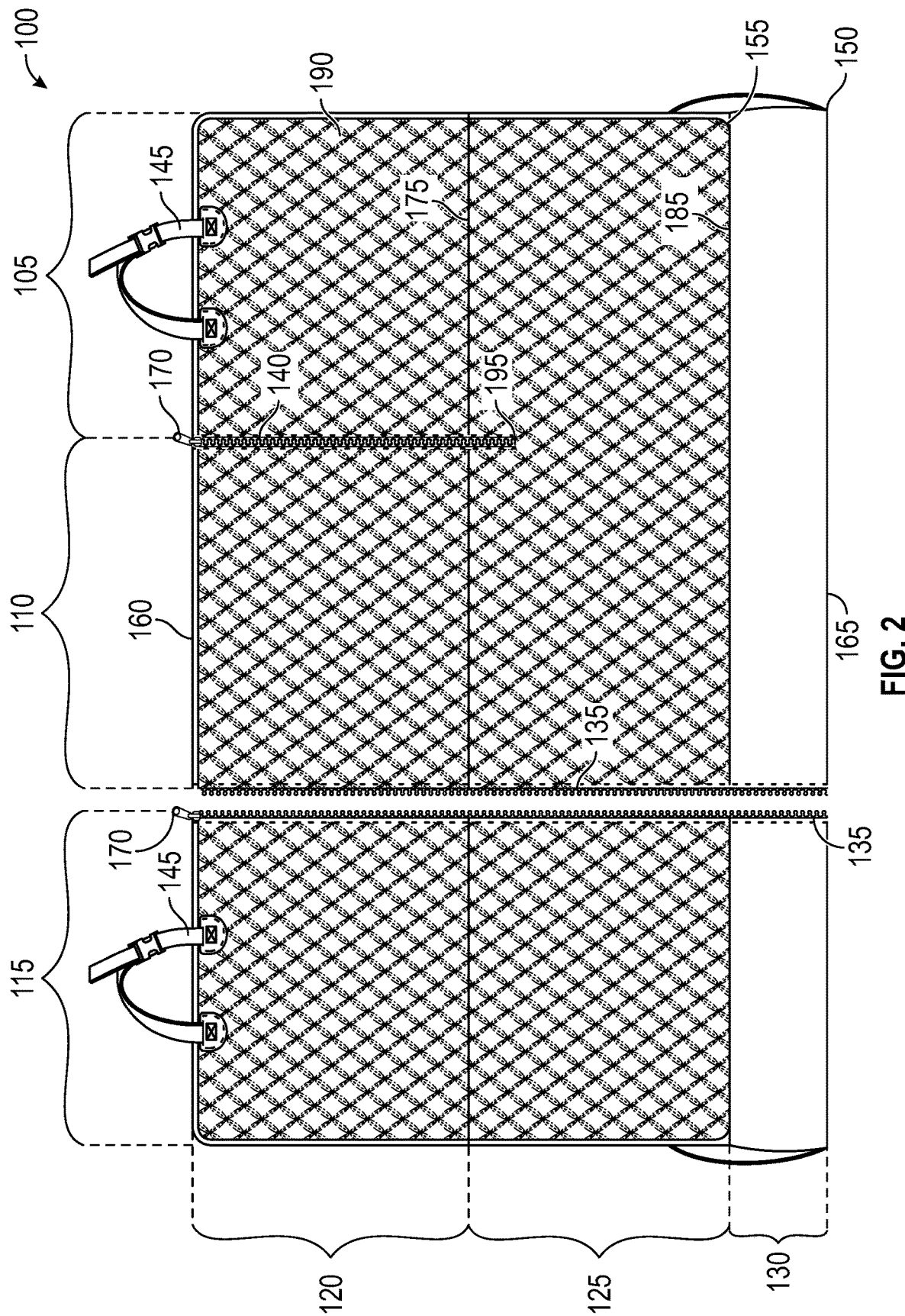
FIG. 2 is a top view of the example cover of FIG. 1, illustrating a first section of an upper portion of the cover uncoupled from a second section and a third section of the upper portion via the first coupling mechanisms, according to some embodiments.

Referring to FIG. 2, the first section 115 may be fully detached at the first slit 135 from the second section 110. The upholster cover 100 may function as one whole piece or as two independent pieces. The first independent piece being the first section 115 and the second independent piece being the second and third sections 110, 105. A bench seat of a vehicle typically accommodates three passengers, a seat on the driver's side, a seat in the middle and a seat on the passenger's side. The seats on the driver's side and the passenger's side of the bench seat may be configured to be moved completely independently from the other two seats. The independent seat may be slid forward or backward or folded on itself independent of the other two seats. The two independent pieces of the upholstery cover 100 shown in FIG. 2 may accommodate the independent movement of one or more seats while covering all three seats of the bench seat. Thus, accommodating the truly modular nature of current car seat configurations.

Figure 3:
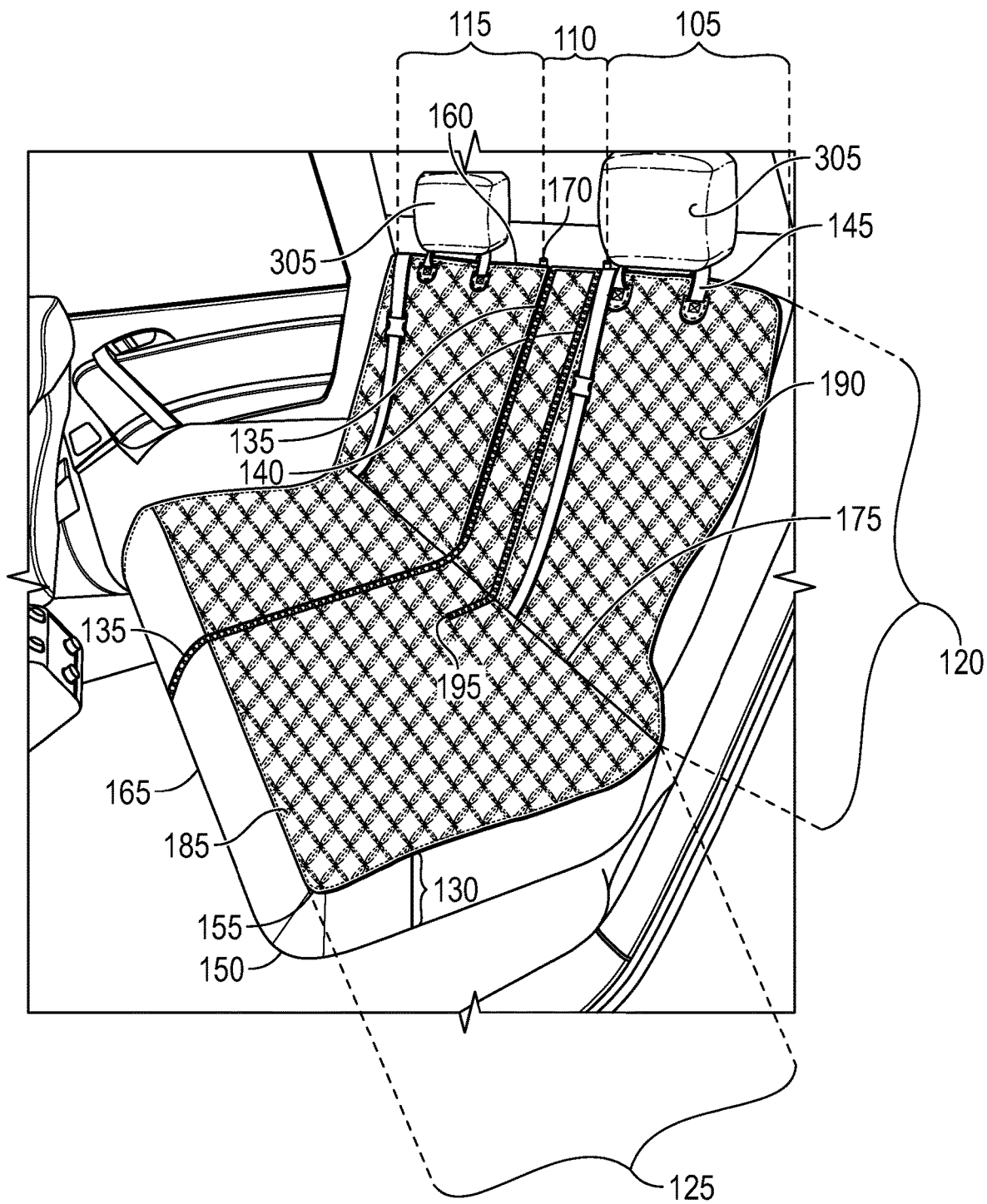
FIG. 3 is an upper perspective view of the cover of FIG. 1, illustrating the cover extending over a bench and backrest of a vehicle seat in one configuration, according to some embodiments.

FIG. 3 shows one embodiment of the upholstery cover 100. The upholstery cover 100 may be disposed on a vehicle bench seat. Typically, the bench seat is in the second or third row of seats in a vehicle. The upper portion 120 may be arranged on the vertically oriented or backrest portion of the seat. The lower portion 125 may be arranged on the horizontally oriented or bench portion of the seat. The folded front portion 130 may cover the front edge of the bench portion of the seat. The fasteners 145 may loop around the headrests 305 of the seats.

According to one embodiment, the first slit 135 may extend the full length of the upholstery cover 100. The second slit 140 may extend the full length of the backrest portion of the seat and partially into the bench portion of the seat. The bench corner 155 of the upholstery cover 100 may correspond with the upper corner edge of the vehicle seat. The bottom corner 150 of the upholstery cover 100 may correspond with the lower corner edge of the vehicle seat.

According to one embodiment, the first section 115 may cover the seat on the passenger's side, the second section 110 may cover the middle seat, and the third section 105 may cover the seat on the driver's side. The seatbelts may be brought over the top of the upholstery cover 100, in one embodiment, so that passengers can be buckled in place while the upholstery cover 100 is on the seat.

Figure 4:
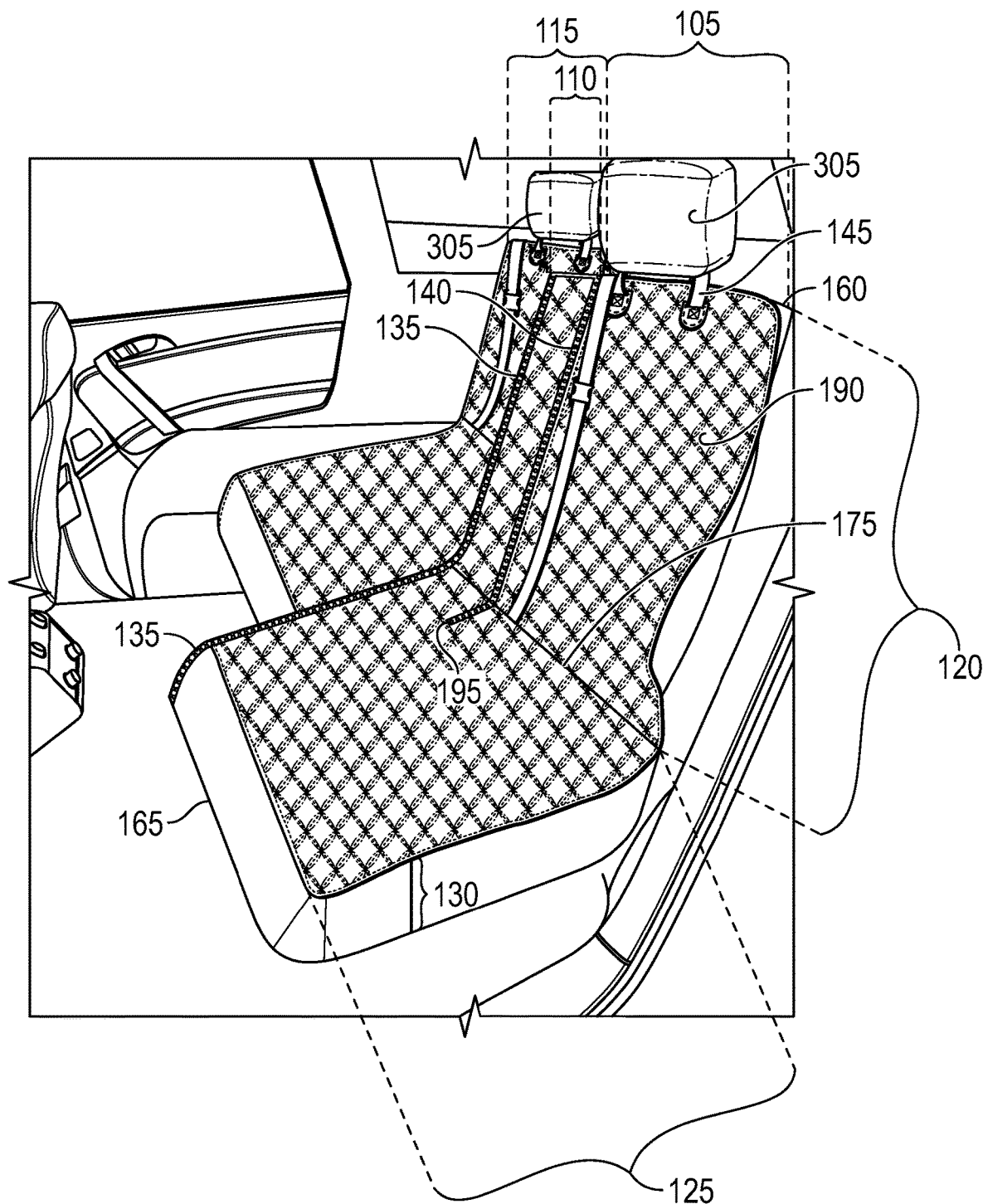
FIG. 4 is an upper perspective view of the cover of FIG. 1, illustrating the cover extending over the bench and the backrest of the vehicle seat in another configuration, according to some embodiments.

Referring now to FIG. 4, in some embodiments, the passenger side seat may be positioned on a plane behind the middle and driver's side seat. The first section 115 of the upholstery cover 100 may be detached at the first slit 135 from the second and third sections 110, 115. The detached first section 115 remains attached to the passenger side seat while the passenger side seat is moved away from the other two bench seats. The first section 115 may be uncoupled from the second section 110 and third section 105 via a coupling mechanism 170, which may include any suitable coupling mechanism, such as for example, buttons, snaps, magnets, clasps, eyelets, hooks, one-directional or bi-directional zippers, etc. In some embodiments, the coupling mechanism 170 may include a hook and loop fastener, such as VELCRO™.

Figure 5:
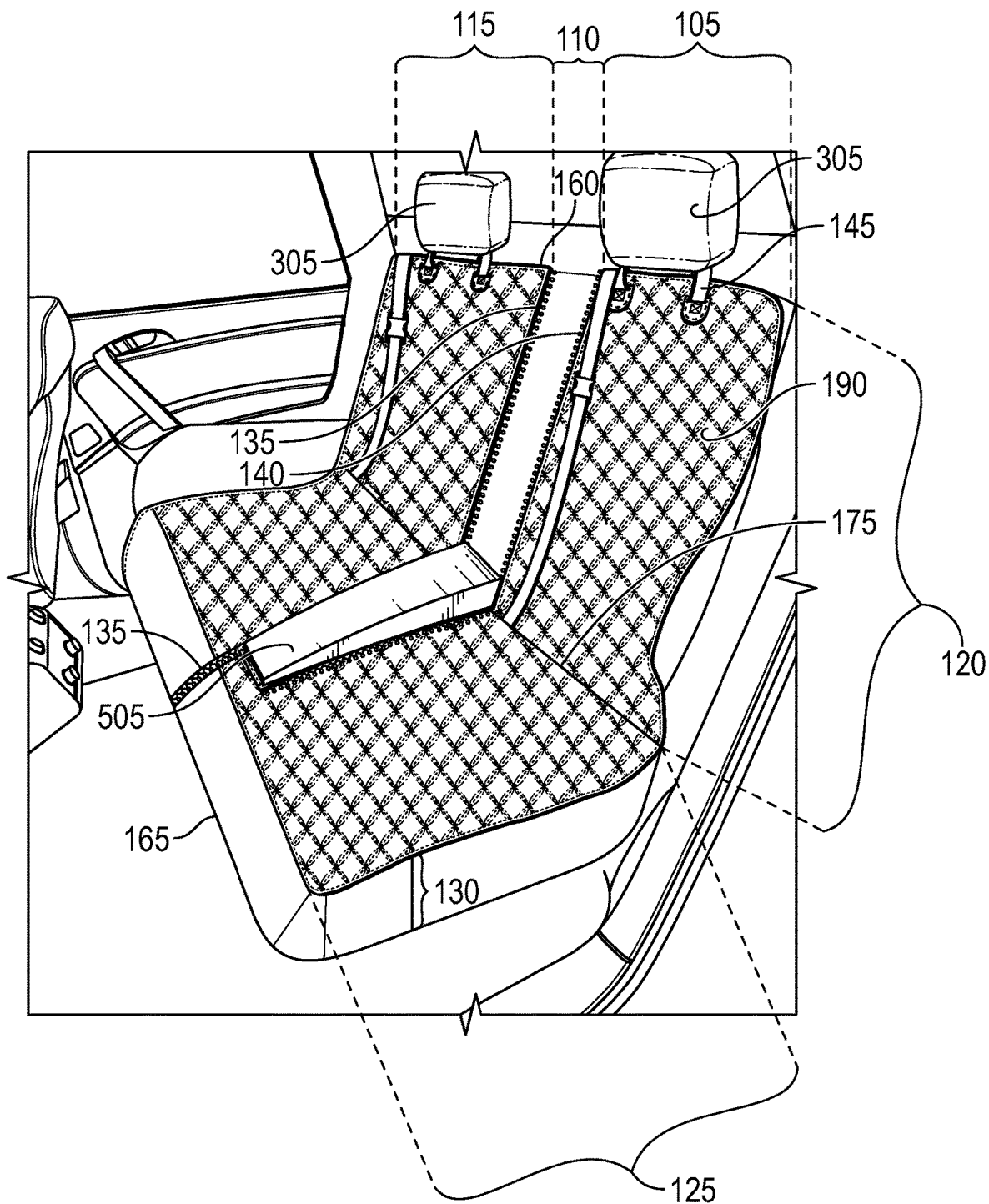
FIG. 5 is an upper perspective view of the cover of FIG. 1, illustrating the cover extending over the bench and the backrest of the vehicle seat in another configuration, according to some embodiments.

Referring now to FIG. 5, in some embodiments, the backrest portion 505 of the middle seat may be folded down onto the bench portion of the seat. According to this embodiment, the upholstery cover 100 is uncoupled at the first slit 135 and the second slit 140. The first slit 135 is partially uncoupled, the upper portion 120 of the first section 115 and the second section 110 are uncoupled but the lower portion 125 of the first section 115 and the second section 110 remain coupled together. The upper portion 120 of the first section 115 and the third section 105 may be disposed vertically on the backrest portion of the seat when the upper portion 120 of the second section 110 is horizontal.

Figure 6:
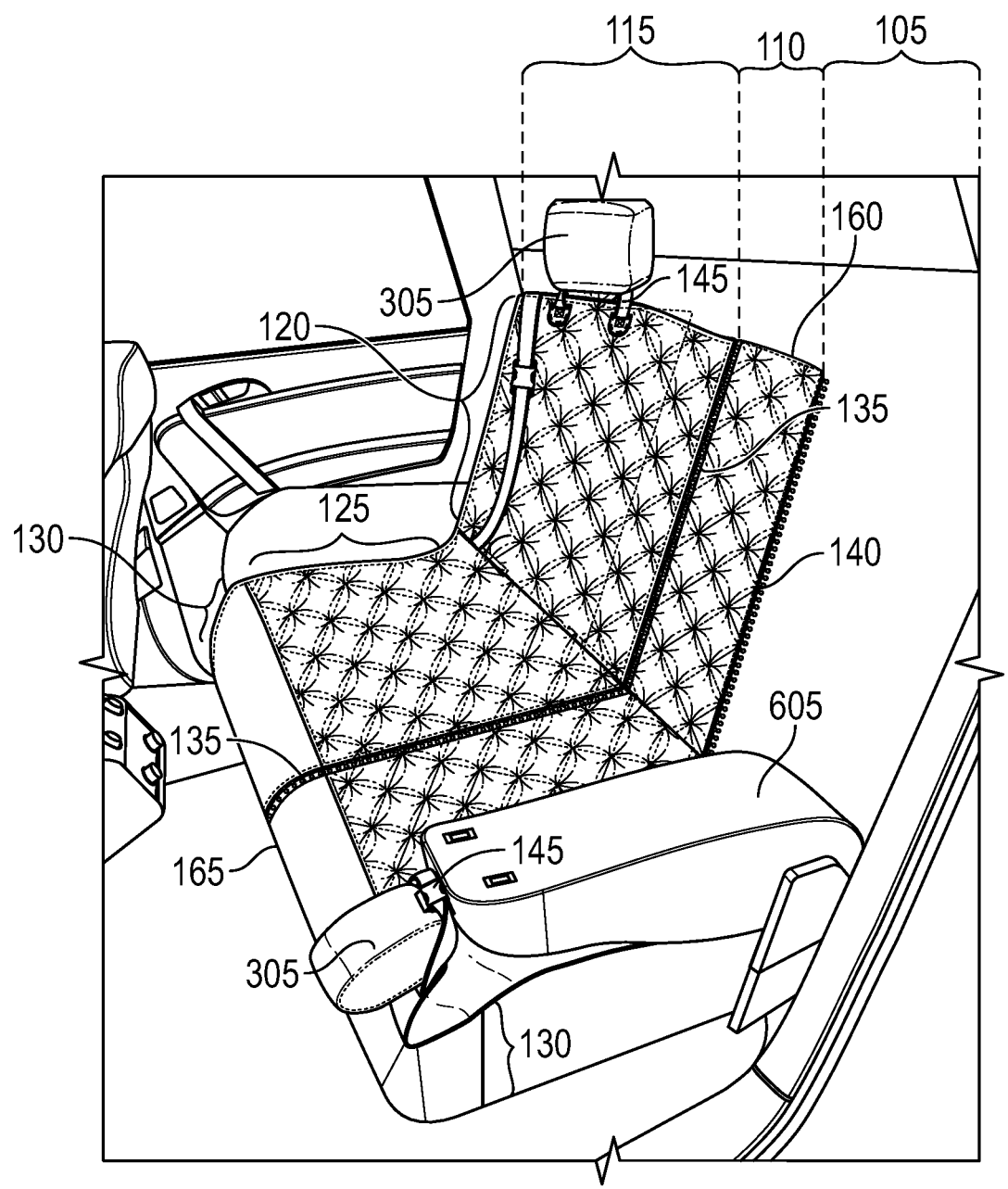
FIG. 6 is an upper perspective view of the cover of FIG. 1, illustrating the cover extending over the bench and the backrest of the vehicle seat in another configuration, according to some embodiments.

Referring now to FIG. 6, in some embodiments, the backrest portion 605 of the driver's side seat is folded down onto the bench portion of the seat. According to this embodiment, the upholstery cover 100 is uncoupled at the second slit 140. For example, the upholstery cover 100 is positioned on the seat, then, a user uncouples the third section 105 from the second section 110 at slit 140 and then folds the backrest portion of the seat down onto the bench portion of the seat. The upper portion 120 of the first section 115 and the second section 110 may be disposed vertically on the backrest portion of the seat when the upper portion 120 of the third section 105 is horizontal. The upholstery cover 100 does not have to be removed to adjust the position of the seats.

Figure 7A:
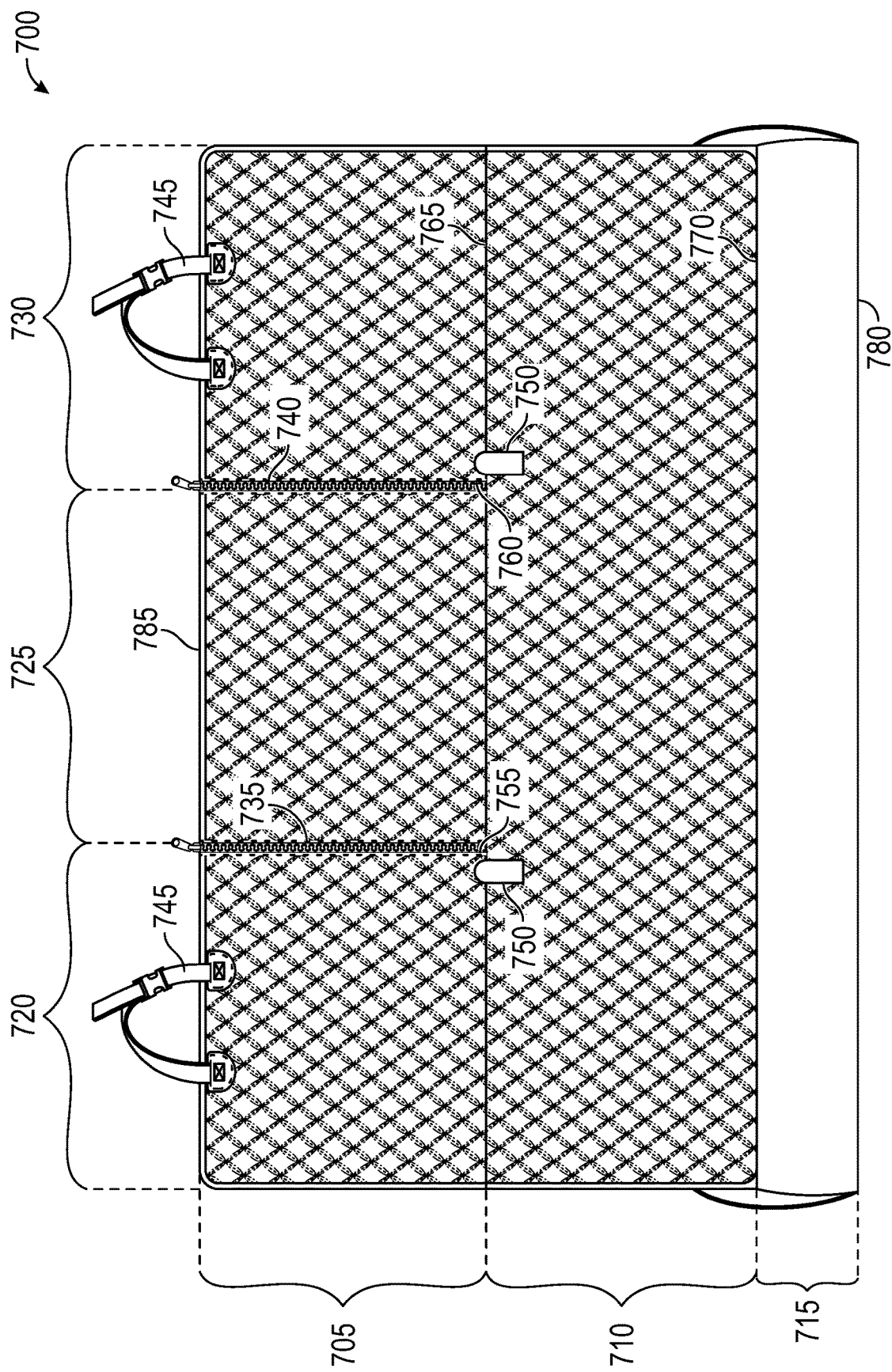
FIG. 7A is a top view of another example cover, according to some embodiments.

FIG. 7A depicts another embodiment of the upholstery cover 700. The first slit 735 and second slit 740 may terminate near the transition 765 between the upper portion and the lower portion. Proximate to the terminus of the first slit 755 and the terminus of the second slit 760 are apertures 750. The apertures may provide access through the upholstery cover 700. In the embodiment shown, the apertures 750 are located in the lower portion 710 of the upholstery cover 700. The first slit 735 and second slit 740 are in the upper portion 705 and terminate just before the lower section 710. According to another embodiment, the first slit 735 and second slit 740 may extend into the lower portion 710.

Figure 7B:
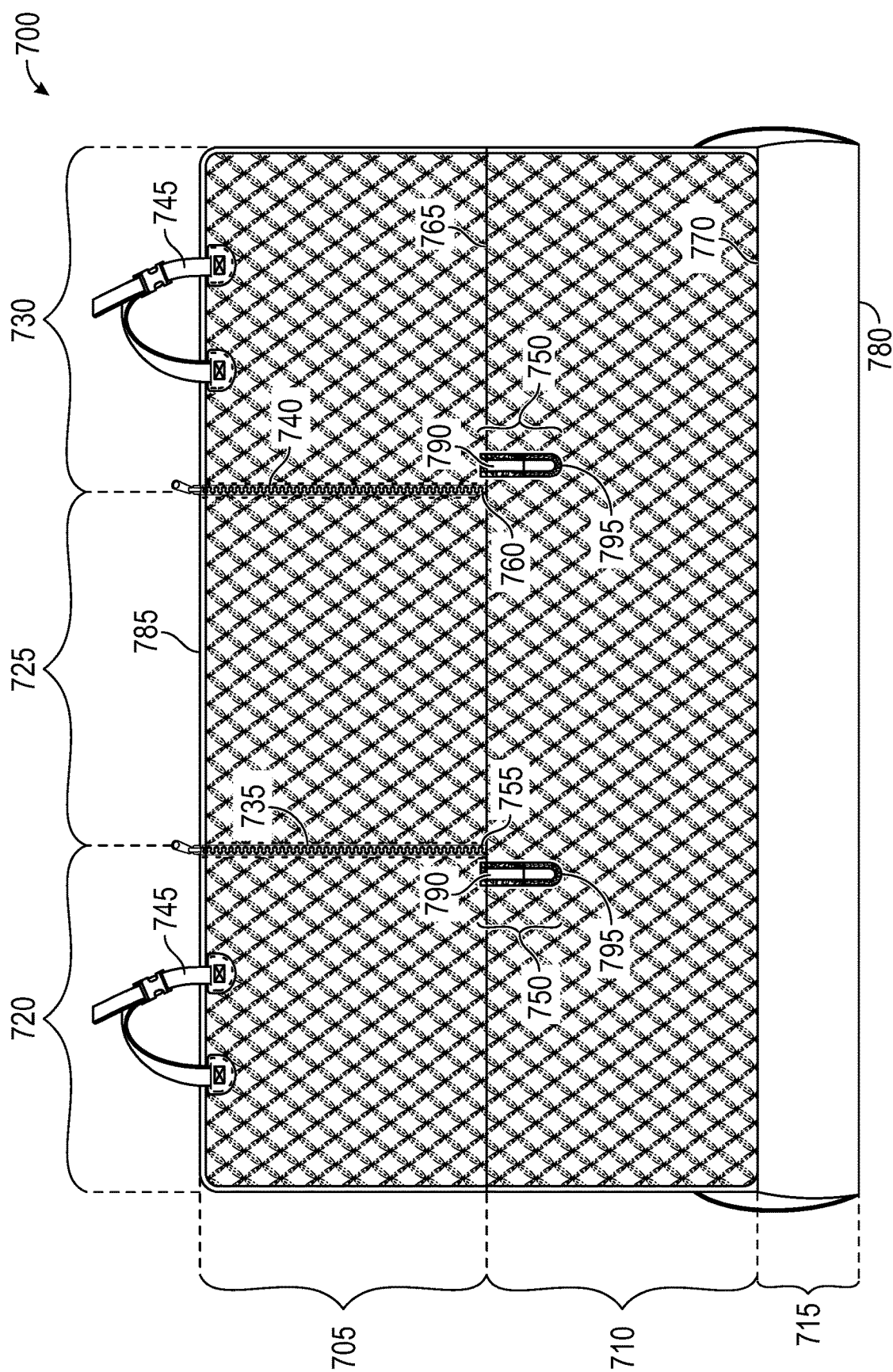
FIG. 7B is a top view of the example cover of FIG. 7A, in another configuration, according to some embodiments.

Referring now to FIG. 7B, in some embodiments, the upholstery cover 700 may include flaps 795 covering the opening 790 of the apertures 750. The flaps 795 may cover the aperture 750 when the seatbelts are not in use. When a user uses the seatbelt with the upholstery cover 700 on the seat, the user may open the flap 795 and pull the seatbelt buckle through the opening 790 in the aperture 750. The flap 795 may prevent dirt from passing through the upholstery cover 700 when the seatbelts are not in use. The flaps 795 may be secured to the upholstery cover 700 or left loose over the opening 790.

Figure 8:
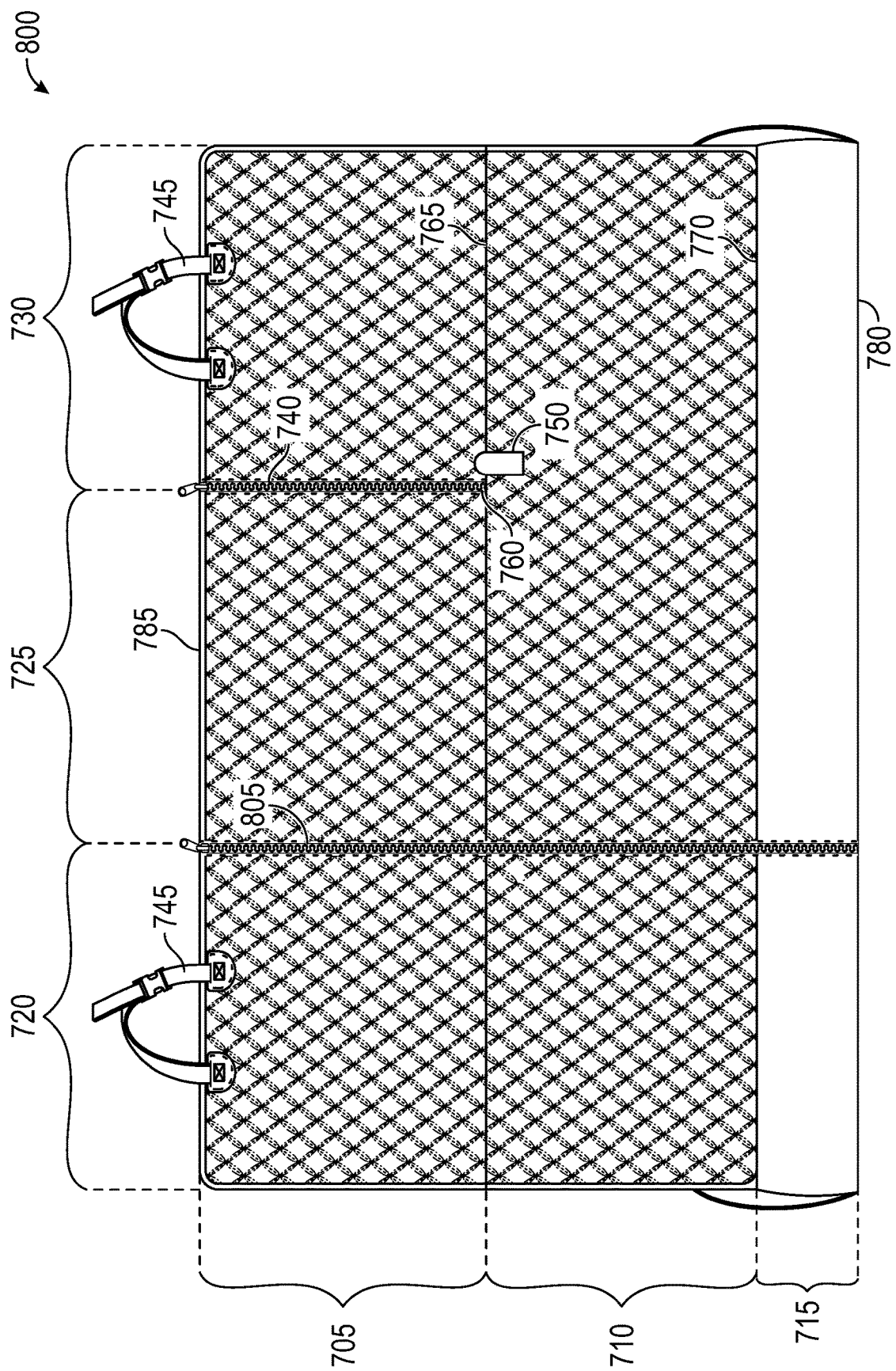
FIG. 8 is a top view of another example cover, according to some embodiments.

FIG. 8 shows another embodiment of the upholstery cover 800. A first slit 805 may extend from the upper edge 785 to a bottom edge of the folded front 780. The first slit 805 may have a first coupling mechanism. The second slit 740 may have a second coupling mechanism. The coupling mechanisms may extend the full length or a partial length of the first slit 805 and/or second slit 740. The coupling mechanisms may include any suitable coupling mechanism, such as for example, buttons, snaps, magnets, clasps, eyelets, hooks, one-directional or bi-directional zippers, etc. In some embodiments, the coupling mechanisms 88 may include a hook and loop fastener, such as VELCRO™.

The first slit may divide the first section 720 from the second section 725. The second slit 740, according to one embodiment, may terminate 760 at the transition 765 between the upper portion 705 and the lower portion 710. An aperture 750 may be proximate to the terminus 760 of the second slit 740. In this embodiment, the upholstery cover 800 may stay on the seat when the passenger side seat moves forward or backward or folds up or down. The upholstery cover 800 may stay on the seat when the backrest portion of the middle seat or the driver's side seat is folded down onto the bench portion of the seat. The seatbelt buckle may pass through the aperture 750 to allow a passenger to use the seatbelts. In another embodiment, the driver's side seat may separate from the middle seat and the passenger side seat, the cover 800 may be configured so that the driver's side seat may slide forward or backward or may fold up or down with the cover 800 still attached.

Figure 9:
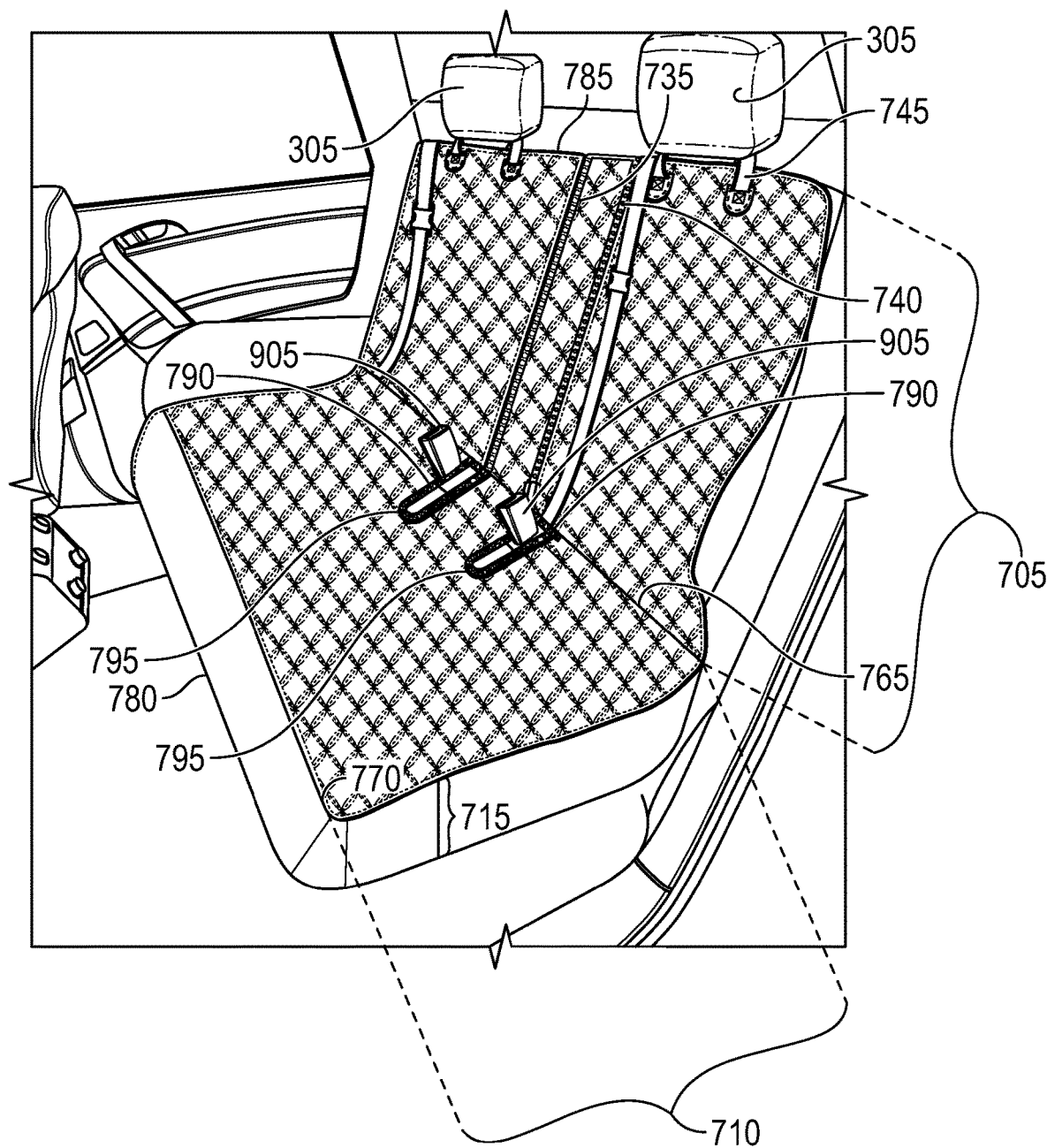
FIG. 9 is an upper perspective view of the cover of FIGS. 7A and 7B, illustrating the cover extending over the bench and the backrest of the vehicle seat in one configuration, according to some embodiments.

Referring now to FIG. 9, in some embodiments, the seatbelt buckles 905 may pass through the openings 790 of the apertures 750 of the upholstery cover 700. The flaps 795 may be folded out to accommodate the seatbelt buckles 905 passing through the openings 790. The first slit 735 and the second slit 740 terminate near the transition 765 between the upper portion 705 and the lower portion 710.

Figure 10:
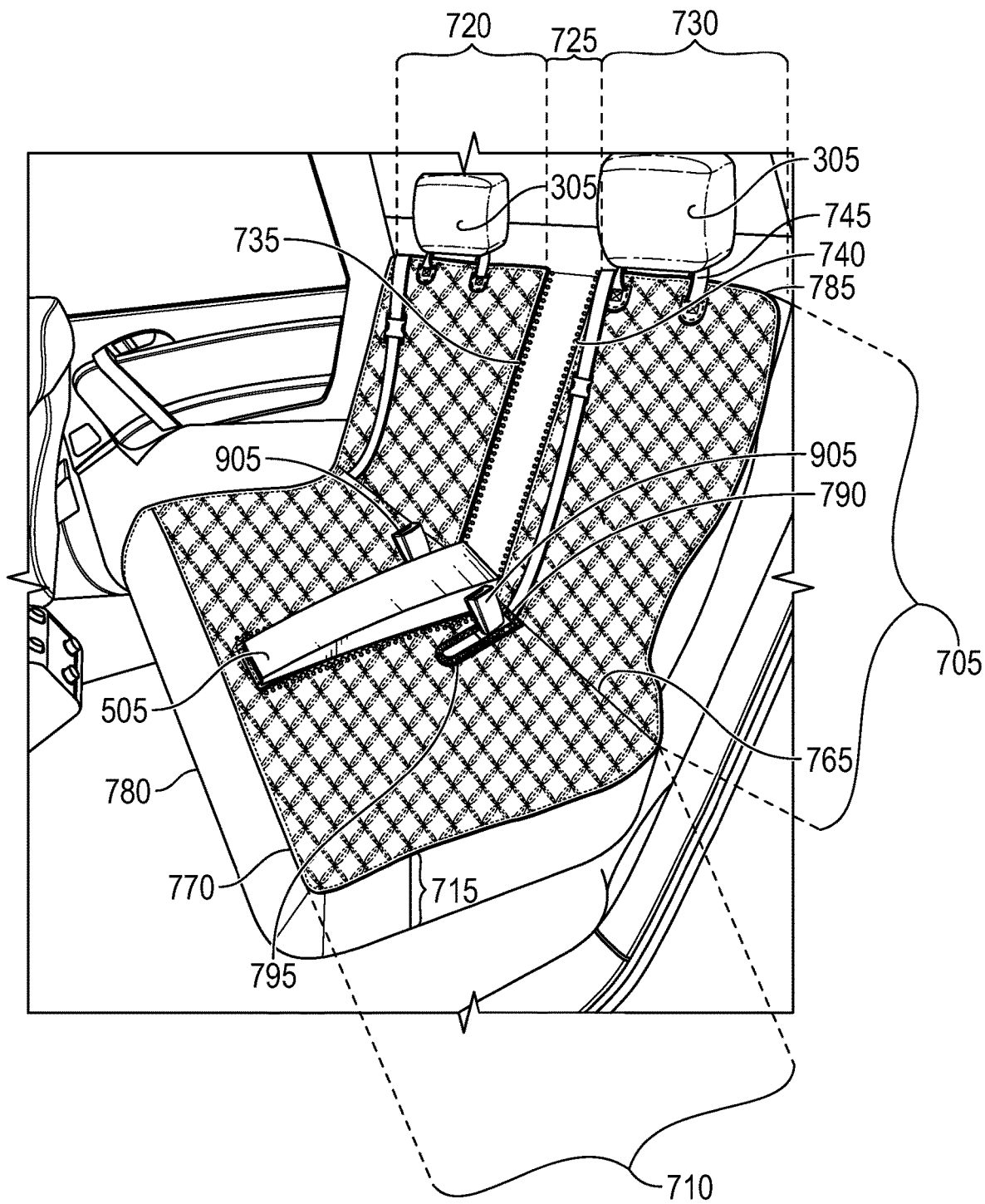
FIG. 10 is an upper perspective view of the cover of FIGS. 7A and 7B, illustrating the cover extending over the bench and the backrest of the vehicle seat in another configuration, according to some embodiments.

FIG. 10 depicts an embodiment of the upholstery cover 700 with the backrest portion of the middle seat folded downward onto the bench portion of the seat. The first slit 735 and the second slit 740 may be opened allowing the upper portion 705 of the second section 725 to fold down onto the lower portion 710. The seatbelt buckles 905 may protrude through the openings 790 in the apertures 750.

Figure 11:
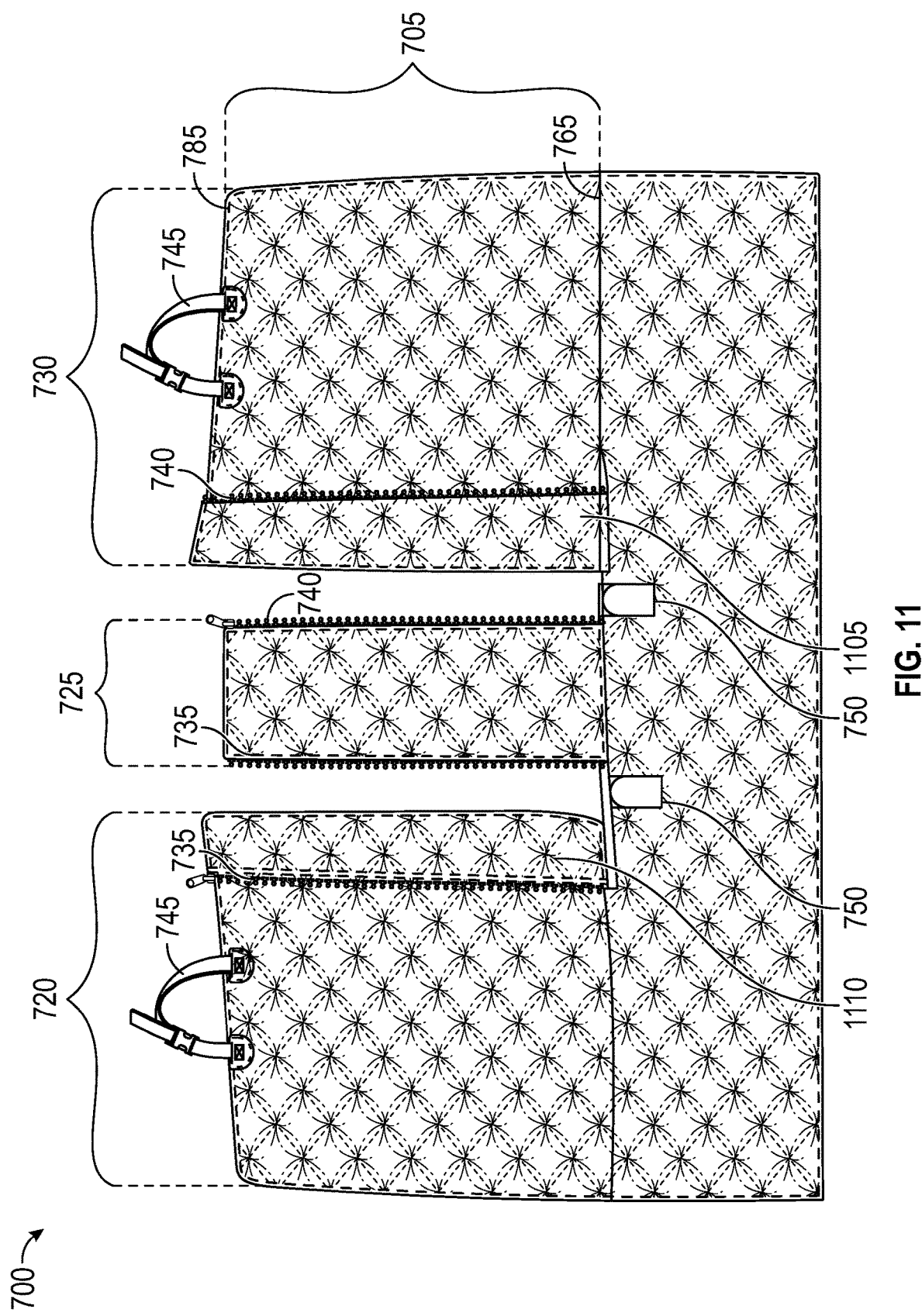
FIG. 11 is a top view of the cover of FIGS. 7A and 7B, illustrating the cover folded over on itself from the opening at the slits and the seatbelt aperture, according to some embodiments.

FIG. 11 depicts another embodiment of the upholstery cover 700. In this embodiment, the first slit 735 and the second slit 740 are open. A folded panel 1110 of the first section 720 may be folded back over the first section 720. A folded panel 1105 of the third section 730 is folded back over the third section 730. The folded panels 1105, 1110 may be open on the upper edge 785 and at the apertures 750. The apertures 750 may provide an opening for the folded panels 1105, 1110 to fold backward to form a square opening instead of a v-shaped opening. The folded panels 1105, 1110 may open to accommodate seatbelts in the vehicle seats. The first slit 735 and the second slit 740 may have coupling mechanisms that extend along at least a portion of the slits 735, 740.

Figure 12A:
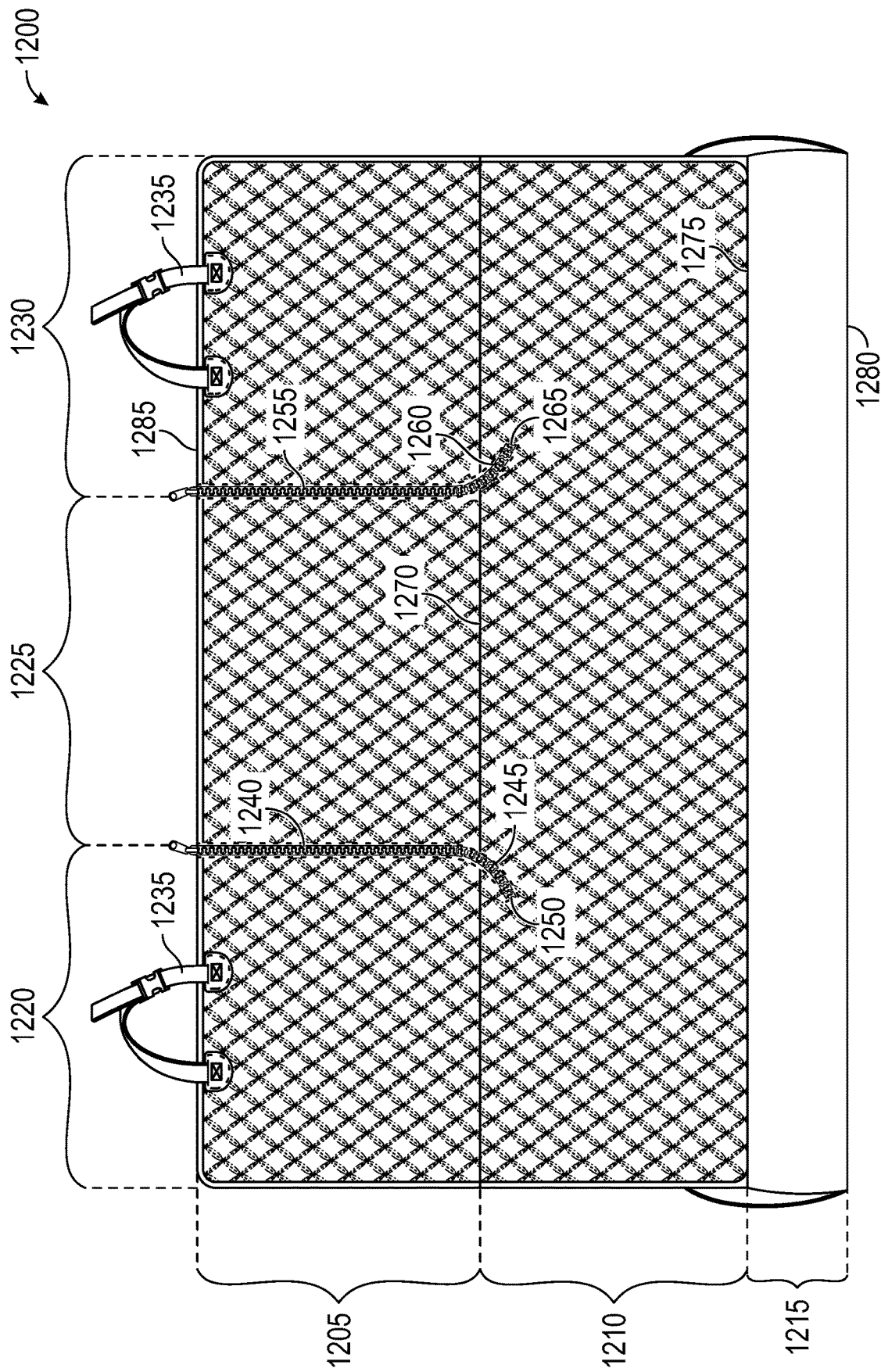
FIG. 12A is a top view of another example cover, according to some embodiments.

Referring now to FIG. 12A, in some embodiments, the first slit 1240 and the second slit 1255 may transition from a first orientation to a second orientation (e.g., vertical, horizontal, angled, slanted). In this embodiment, the curved transition 1245 in the first slit 1240 and the curved transition 1260 in the second slit 1255 may be near the transition 1270 between the upper portion 1205 and the lower portion 1210 of the upholstery cover 1200. The first orientation may be vertical, near vertical, curved, horizontal, near horizontal or any other orientation. The top of the first slit 1240 and/or the second slit 1255 may intersect the upper edge 1285 of the cover 1200 at a 90-degree angle or any other suitable angle (e.g., 15 degrees, 30 degrees, 45 degrees, 60 degrees, 75 degrees).

The second orientation may be vertical, near vertical, curved, horizontal, near horizontal or any other orientation. The first slit 1240 or the second slit 1255 may curve outward toward the sides of the cover 1200 or the first slit 1240 and the second slit 1255 may curve inward toward the center of the cover 1200. The first slit 1240 and the second slit 1255 may curve in the same direction or opposite directions.

Coupling mechanisms in the first slit 1240 and the second slit 1255 may extend the full length or a partial length of the first slit 1240 or second slit 1255. The terminus 1250 of the first slit 1240 and the terminus 1265 of the second slit 1265 may be located in the upper portion 1205, the lower portion 1210 or the folded front portion 1215 of the upholstery cover 1200. The degree of curvature of the curved transitions 1245, 1260 may range from 0 degrees to 360 degrees (e.g., 45 degrees, 90 degrees, 180 degrees) or may be angled. The first slit 1240 may have the same or a different degree of curvature than the second slit.

Figure 12B:
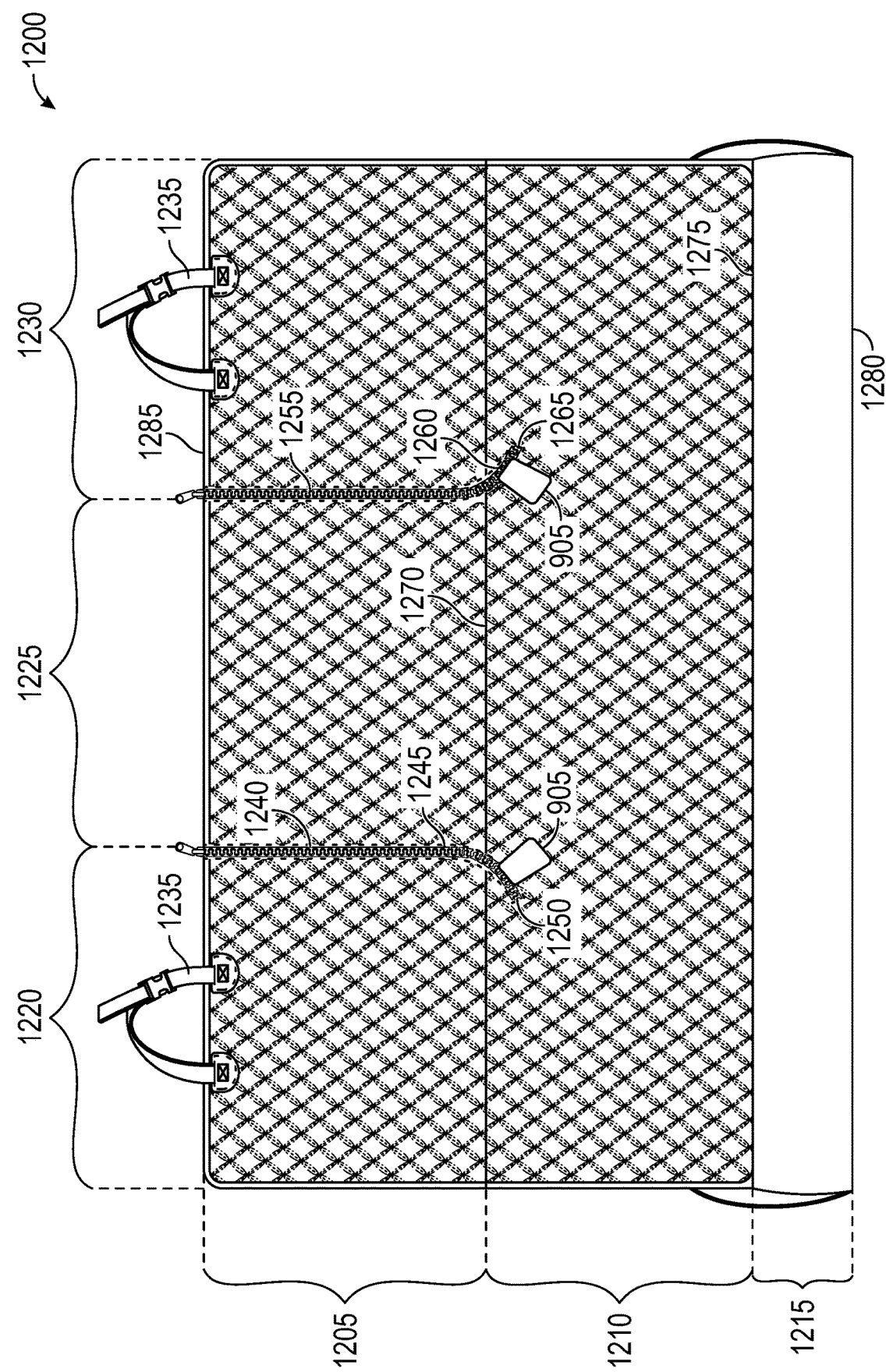
FIG. 12B is a top view of the cover of FIG. 12A, illustrating the seatbelt buckles passing through the slits in the cover, according to some embodiments.

FIG. 12B shows another embodiment of the upholstery cover 1200 of FIG. 12A. The first slit 1240 may have an opening near the terminus 1250 of the first slit 1240. The second slit 1255 may have an opening near the terminus 1265 of the second slit 1255. The opening in the first slit 1240 and the opening in the second slit 1255 may permit the seatbelt buckles 905 to pass through the upholstery cover 1200. In many vehicles the seatbelt buckles 905 are in the bench portion of the vehicle seat. The curved section of the slits 1245, 1260 may be near or within the lower portion 1210 of the upholstery cover 1200 to accommodate the seatbelt buckles 905 in the bench portion of the vehicle seat. The first slit 1240 and the second slit 1255 may each have a coupling mechanism. The coupling mechanism may extend a full length of a partial length of the first slit 1240 or the second slit 1255. The coupling mechanism may be configured to be opened to allow the seat belt buckle 905 to pass through the cover 1200. The coupling mechanisms may include any suitable coupling mechanism, such as for example, buttons, snaps, magnets, clasps, eyelets, hooks, one-directional or bi-directional zippers, etc. In some embodiments, the coupling mechanisms 88 may include a hook and loop fastener, such as VELCRO™.

Figure 12C:
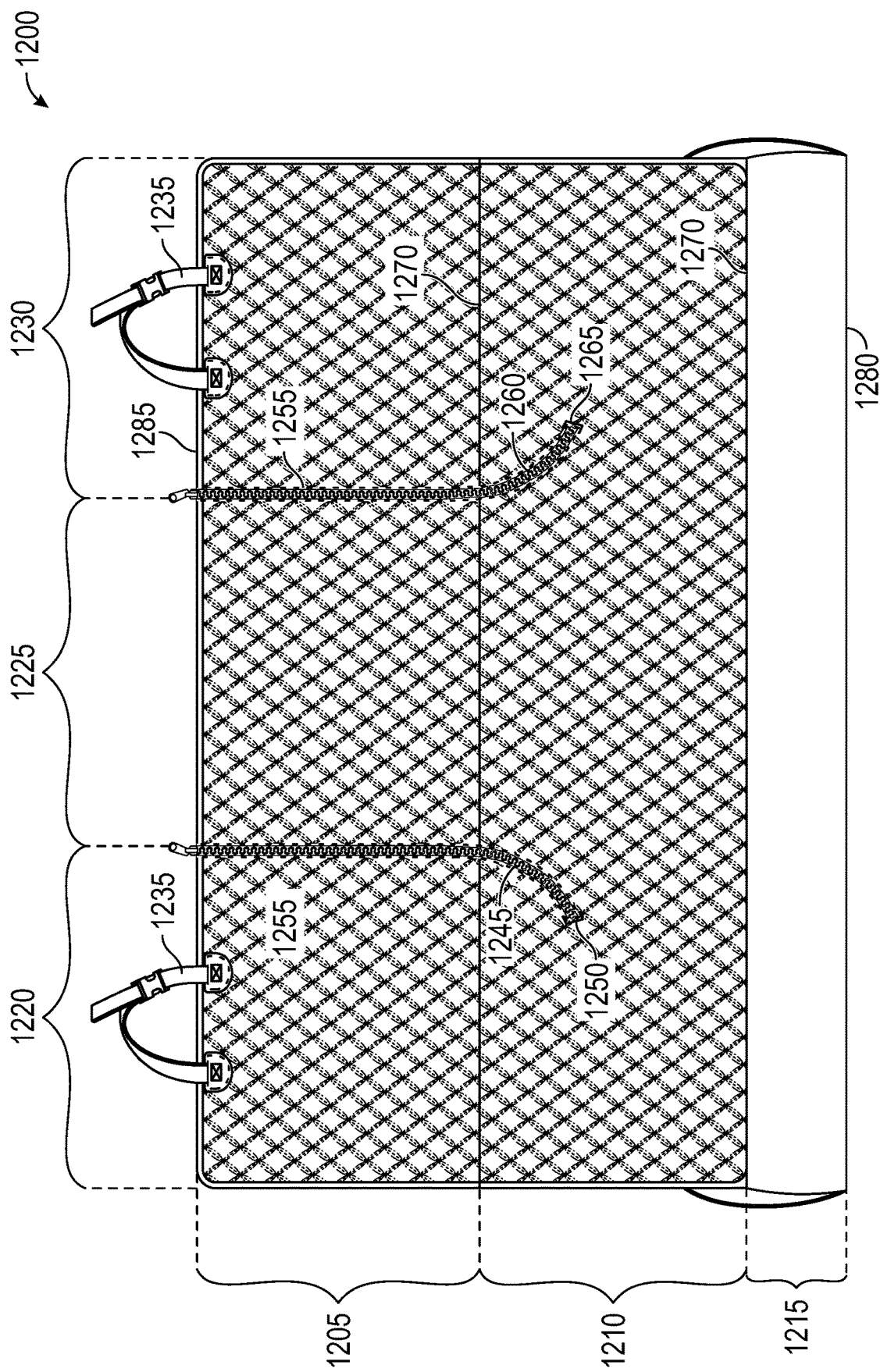
FIG. 12C is a top view of another example cover, according to some embodiments.

Referring now to FIG. 12C, in some embodiments, the curved portion 1245, 1260 of the slits 1240, 1255 may be positioned closer to the upper edge 1285, the transition 1270 between the upper portion 1205 and the lower portion 1210, or the lower edge 1270 of the cover 1200. The curved portion 1245 of the first slit 1240 and the curved portion 1260 of the second slit 1260 may be positioned completely in the lower portion 1210 of the upholstery cover 1200. In other embodiments, the curved transitions 1245, 1260 may be higher or lower in the slits 1240, 1255. The curved slits 1240, 1255 may extend deep into the lower portion 1210 or terminate near the transition 1270 between the upper portion 1205 and the lower portion 1210 of the cover 1200. The degree of curvature in the slits 1240, 1255 may be adapted to accommodate different seat and seatbelt configurations. The slits 1240, 1255 may extend all the way to the lower edge 1270 or the bottom edge 1280 of the folded front portion 1215.

Figure 13:
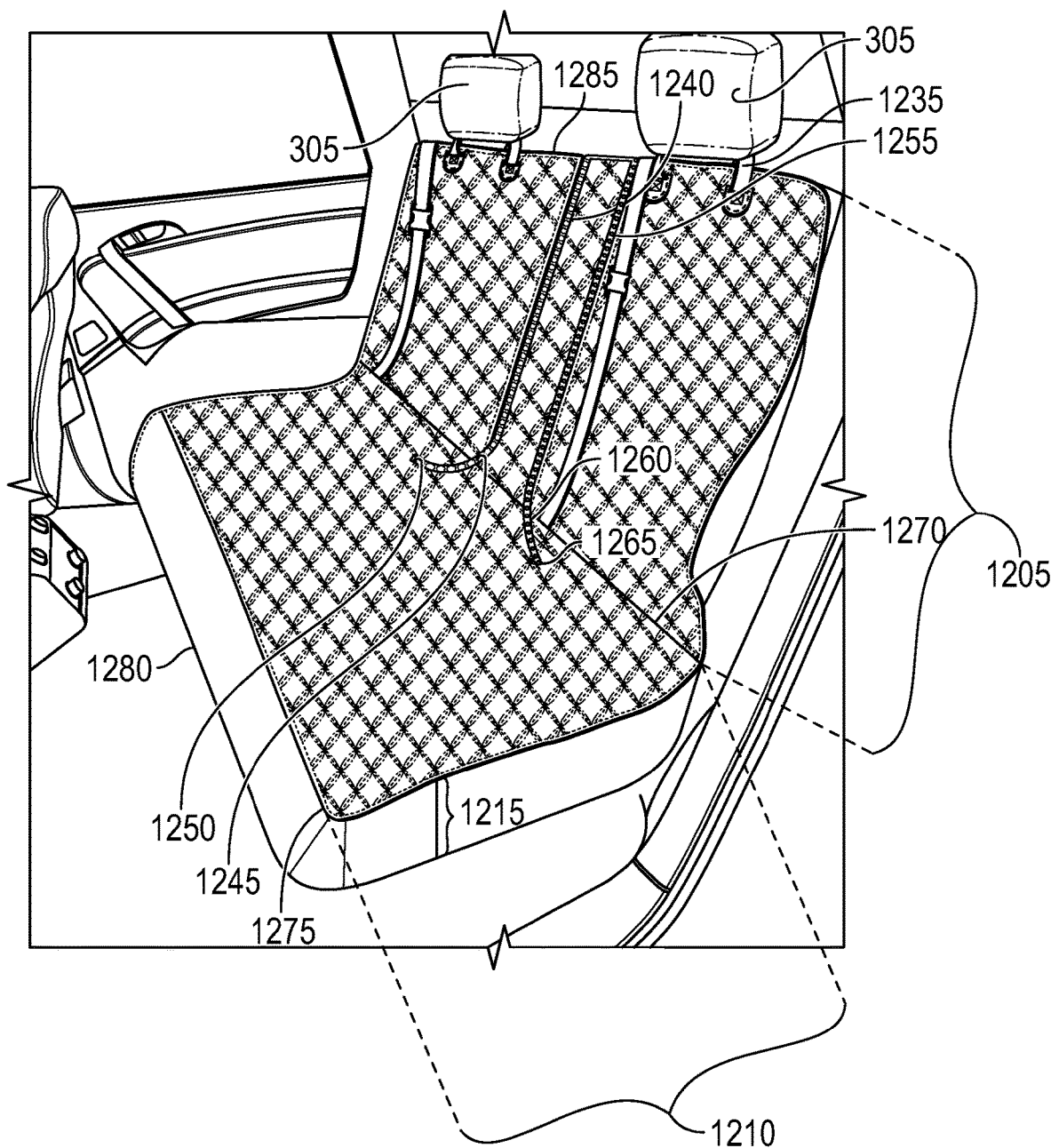
FIG. 13 is an upper perspective view of the cover of FIG. 12A, illustrating the cover extending over the bench and the backrest of the vehicle seat in one configuration, according to some embodiments.

FIG. 13 shows the upholstery cover of FIG. 12A on a vehicle seat. According to this embodiment, the terminus 1250 of the first slit 1240 and the terminus 1265 of the second slit 1255 may be below the transition 1270 between the upper portion 1205 and the lower portion 1210. In the embodiment shown the slits 1240, 1255 may be closed to prevent dirt and other items from passing through the upholstery cover 1200 onto the vehicle seat. A first coupling mechanism and a second coupling mechanism may partially or fully close the first slit 1240 and the second slit 1255.

Figure 14:
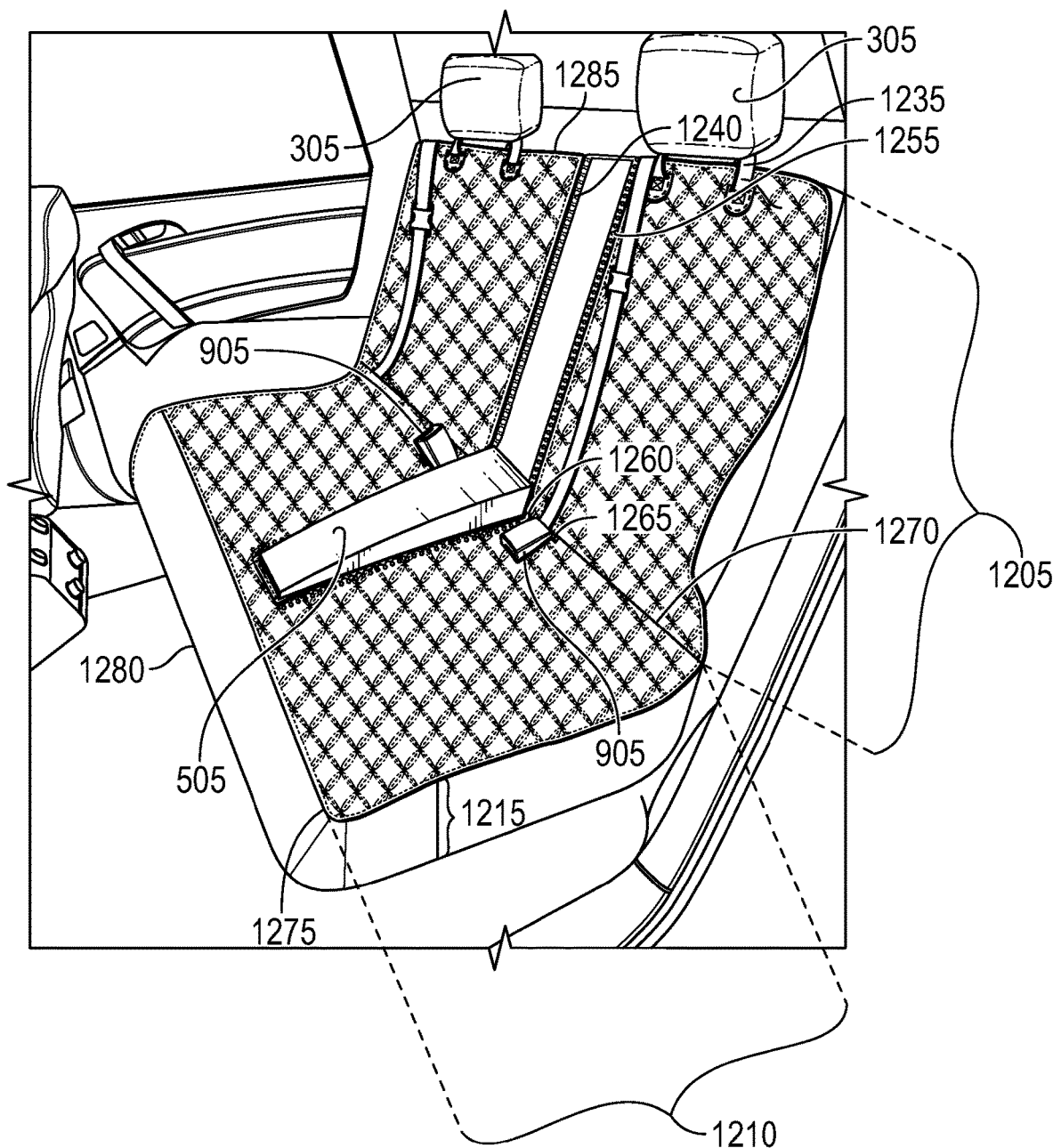
FIG. 14 is an upper perspective view of the cover of FIG. 12A, illustrating the cover extending over the bench and the backrest of the vehicle seat in another configuration, according to some embodiments.

FIG. 14 depicts one embodiment of the upholstery cover 1200 of FIG. 12A on a vehicle seat with the backrest of the middle seat folded down onto the bench. In this embodiment, the upholstery cover 1200 is on a bench seat in a vehicle and the first slit 1240 and the second slit 1255 are open. The backrest portion of the middle seat is folded down onto the bench portion. The curved slits 1240, 1255 are open a sufficient distance to permit the seatbelt buckles 905 to pass through the slits 1240, 1255.

In some embodiments, a kit may include multiple sections that may be coupled together to form the upholstery cover 100, the upholstery cover 700, the upholstery cover 800, or the upholstery cover 1200. In some embodiments, the multiple sections that may be coupled together to form the upper portion 120 and/or the lower portion 125. The upper portion 120 and/or the lower portion 125 may have different sizes or widths, and a user may couple any of the multiple sections together based on the particular seat configuration and dimensions of the vehicle of the user. In some embodiments, both outer edges of one each of the multiple sections may include the coupling mechanism 170 to facilitate coupling of any of the multiple sections in any order to correspond to a particular seat configuration and dimensions of the vehicle.

In some embodiments, the upholstery cover 100 only comprises lower portion 125 and upper portion 120, wherein the upholstery cover 100 is provided without the folded front portion 130. Further, in some embodiments the upholstery cover 100 only comprises lower portion 125, wherein the upholstery cover 100 is provided without upper portion 120 or folded front portion 130. Further still, in some embodiments the upholstery cover 100 comprises only lower portion 125 and folded front portion 130, wherein the upholstery cover 100 is provided without upper portion 120. Thus, the upholstery cover 100 may be provided in a variety of configurations and setups within the scope and teaching of the present invention.

In some embodiments, each section of the upholstery cover 100 may have a different width. In some embodiments, each section of the upholstery cover 100 may have the same width. In some embodiments, the first section 115 and the third section 105 may have a first width and the second section 110 may have a second width. In some embodiments, the second section 110 of the upholstery cover 100 may have a smaller width than the first section 115 and the third section 105.

One of skill in the art will appreciate that the various features and elements of the various embodiments of the present invention may be modified and/or combined within the spirit of the present invention to provide a seat cover. For example, the size, dimensions, shapes, proportions and materials of the present invention may be modified as desired or necessary based on, for example, a vehicle configuration, shape, or dimensions. For example, quantity and/or placement of one or more slits in the upper portion 120 and/or the lower portion 125 may be varied. In some embodiments, a particular cover, such as, for example, the upholstery cover 100, the upholstery cover 700, the upholstery cover 800, or the upholstery cover 1200, may be configured to fit various vehicle interiors and seat configurations, as described in the present disclosure.

The present invention may be embodied in other specific forms without departing from its structures, methods, or other essential characteristics as broadly described herein and claimed hereinafter. Therefore, the described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An upholstery cover for a vehicle, comprising:
   a first lateral edge;
   a second lateral edge opposite the first lateral edge;
   an upper edge extending from the first lateral edge to the second lateral edge;
   a lower edge opposite the upper edge extending from the first lateral edge to the second lateral edge; and
   a first slit comprising a first length extending from the upper edge toward the lower edge, the first slit a first distance from the first lateral edge, a first section between the first lateral edge and the first slit, wherein the first slit further comprises a second length that diverges towards the first lateral edge or the second lateral edge, and wherein the second length comprises a closed terminus.

2. The upholstery cover of claim 1, further comprising a second slit a second length from the first lateral edge.

3. The upholstery cover of claim 1, wherein the first slit comprises a first fastener, the first fastener extending a full length or a partial length of the first slit.

4. The upholstery cover of claim 2, further comprising a second section between the first slit and the second slit and a third section between the second slit and the second lateral edge.

5. The upholstery cover of claim 4, wherein the further comprising a first fastener comprising a zipper, the zipper partially disconnecting the first section from the second section when the zipper is in an open position.

6. The upholstery cover of claim 1, wherein a portion of the first slit in proximity to the closed terminus is configured to be selectively open or closed.

7. The upholstery cover of claim 4, wherein the second slit is connected by a second fastener, the second fastener extending a full length or a partial length of the second slit.

8. The upholstery cover of claim 7, wherein the second fastener comprises a zipper, the zipper partially disconnecting the second section from the third section when the zipper is in an open position.

9. The upholstery cover of claim 1, further comprising an aperture through the upholstery cover.

10. The upholstery cover of claim 9, further comprising a removable cover for the aperture.

11. The upholstery cover of claim 9, wherein the aperture is adjacent to the first slit.

12. The upholstery cover of claim 9, wherein the aperture is adjacent to a terminus of the first slit.

13. The upholstery cover of claim 1, wherein the first slit comprises a bi-directional zipper, thereby allowing a bottom portion of the bi-directional zipper in proximity to the closed terminus to be selectively opened and closed independently of a top portion of the bi-directional zipper.

14. The upholstery cover of claim 13, wherein the bottom portion of the bi-directional zipper is configured to allow a seatbelt buckle to protrude through the upholstery cover without creating a substantial gap in the upholstery cover.

15. The upholstery cover of claim 1, wherein the first length slit transitions to the second length at a midpoint between the upper edge and the lower edge.

16. The upholstery cover of claim 1, wherein the first length slit transitions to the second length above a midpoint between the upper edge and the lower edge.

17. The upholstery cover of claim 1, wherein the first slit length transitions to the second length below a midpoint between the upper edge and the lower edge.

18. The upholstery cover of claim 17, wherein the first slit comprises a bi-directional zipper, thereby allowing a bottom portion of the bi-directional zipper in proximity to the closed terminus to be selectively opened and closed independently of a top portion of the bi-directional zipper.

19. The upholstery cover of claim 18, wherein the bottom portion of the bi-directional zipper is configured to allow a seatbelt buckle to protrude through the upholstery cover without creating a substantial gap in the upholstery cover.

20. The upholstery cover of claim 2, wherein the wherein the second slit comprises a third length extending from the upper edge toward the lower edge and a fourth length that diverges towards the first lateral edge or the second lateral edge, and wherein the fourth length comprises a closed terminus.

* * * * *